US012585819B2

(12) United States Patent
November et al.

(10) Patent No.: US 12,585,819 B2
(45) Date of Patent: *Mar. 24, 2026

(54) SYSTEMS, METHODS, AND MEDIA FOR GENERATING DOCUMENTS CONTAINING CONFIDENTIAL INFORMATION

(71) Applicant: Institutional Capital Network, Inc., New York, NY (US)

(72) Inventors: Michael November, Katonah, NY (US); Thomas M. Fortin, New York, NY (US)

(73) Assignee: Institutio6al Capital Network, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,881

(22) Filed: Nov. 20, 2023

(65) Prior Publication Data

US 2024/0354441 A1     Oct. 24, 2024

Related U.S. Application Data

(63) Continuation of application No. 17/567,640, filed on Jan. 3, 2022, now Pat. No. 11,954,227, which is a
(Continued)

(51) Int. Cl.
| | |
|---|---|
| *G06F 21/62* | (2013.01) |
| *G06F 16/955* | (2019.01) |
| *H04L 9/32* | (2006.01) |

(52) U.S. Cl.
CPC ...... *G06F 21/6245* (2013.01); *G06F 16/9566* (2019.01); *H04L 9/3213* (2013.01)

(58) Field of Classification Search
CPC . G06F 21/6245; G06F 16/9566; H04L 9/3213
(Continued)

(56) References Cited

U.S. PATENT DOCUMENTS 5,996,011 A * 11/1999 Humes .................. H04L 63/102
726/13
9,081,978 B1 * 7/2015 Connolly ............ G06F 21/6227
(Continued)

FOREIGN PATENT DOCUMENTS

| | | |
|---|---|---|
| JP | 2002-41347 | 2/2002 |
| JP | 2016-133729 | 7/2016 |

(Continued)

OTHER PUBLICATIONS

Extended European Search Report dated Feb. 5, 2025 in EP Patent Application No. 22828924.5, pp. 1-9.
(Continued)

*Primary Examiner* — Jacob Lipman
(74) *Attorney, Agent, or Firm* — Byrne Poh LLP

(57) ABSTRACT

Mechanisms for generating documents with confidential information are provided, the systems comprising: a memory; and a first collection of at least of one hardware processor coupled to the memory and configured to: receive from a user device a request for a first document with confidential information; generate a second document, that corresponds to the first document, with at least one token corresponding to the confidential information; transmit the second document to a second collection of at least one hardware processor in a computer network that is entitled to access the confidential information; receive from the second collection of at least one hardware processor in the computer network a uniform resource locator (URL) corresponding to the first document; and transmit the URL to the user device. In some of these mechanisms, the user device is in the computer network.

21 Claims, 9 Drawing Sheets

Low-Trust Network

Low-Trust Server 104          102

114

Communication Network 106

114          114
114

High-Trust Server 110     User Device 112     User Device 112

High-Trust Network     108

100

Related U.S. Application Data continuation of application No. 17/356,097, filed on Jun. 23, 2021, now Pat. No. 11,232,231, and a continuation of application No. 17/356,104, filed on Jun. 23, 2021, now Pat. No. 11,222,140, and a continuation of application No. 17/356,109, filed on Jun. 23, 2021, now Pat. No. 11,216,590.

(58) Field of Classification Search
USPC .......................................................... 726/27
See application file for complete search history.

(56) References Cited

U.S. PATENT DOCUMENTS

| | | | | |
|---|---|---|---|---|
| 11,232,231 B1 * | 1/2022 | November | ............ | H04L 9/3213 |
| 11,954,227 B2 * | 4/2024 | November | ............ | H04L 9/3213 |
| 2003/0182232 A1 * | 9/2003 | Zeltzer | ................... | G16H 10/60 |
| | | | | 705/51 |
| 2003/0182435 A1 * | 9/2003 | Redlich | ................... | G06F 21/62 |
| | | | | 726/16 |
| 2005/0138110 A1 | 6/2005 | Redlich et al. | | |
| 2009/0147292 A1 | 6/2009 | Shimura et al. | | |
| 2009/0254572 A1 * | 10/2009 | Redlich | ................... | G06Q 10/10 |
| 2011/0239113 A1 | 9/2011 | Hung et al. | | |
| 2014/0236839 A1 | 8/2014 | D'Souza | | |
| 2015/0096056 A1 | 4/2015 | Mattsson et al. | | |
| 2015/0312038 A1 | 10/2015 | Palanisamy | | |
| 2018/0373885 A1 * | 12/2018 | Arad | ..................... | G06F 21/629 |

FOREIGN PATENT DOCUMENTS

| | | |
|---|---|---|
| JP | 2021-064388 | 4/2021 |
| WO | WO 2017/070599 | 10/2016 |

OTHER PUBLICATIONS

International Preliminary Report on Patentability in International Application No. PCT/US2022/018380, pp. 1-13.

International Search Report and Written Opinion dated Jun. 24, 2022 in International Application No. PCT/US2022/018380, pp. 1-14.

Notice of Allowance dated Jan. 30, 2024 in CA Patent Application No. 3174174, pp. 1.

Notice of Allowance dated Aug. 16, 2023 in U.S. Appl. No. 17/567,640, pp. 1-50.

Notice of Allowance dated Nov. 24, 2021 in U.S. Appl. No. 17/356,109, pp. 1-3.

Notice of Allowance dated Nov. 30, 2021 in U.S. Appl. No. 17/356,104, pp. 1-4.

Notice of Allowance dated Dec. 2, 2021 in U.S. Appl. No. 17/356,097, pp. 1-4.

Notice of Allowance dated Jun. 10, 2025 in JP Patent Application No. 2023-579528, pp. 1-6.

Office Action dated Apr. 25, 2023 in U.S. Appl. No. 17/567,640, pp. 1-38.

Office Action dated Jul. 12, 2023 in CA Patent Application No. 3174174, pp. 1-4.

Office Action dated Aug. 11, 2021 in U.S. Appl. No. 17/356,097, pp. 1-8.

Office Action dated Aug. 11, 2021 in U.S. Appl. No. 17/356,104, pp. 1-8.

Office Action dated Aug. 11, 2021 in U.S. Appl. No. 17/356,109, pp. 1-8.

Office Action dated Aug. 12, 2024 in CA Patent Application No. 3,239,908, pp. 1-5.

Office Action dated Oct. 2, 2024 in CA Patent Application No. 3,239,901, pp. 1-5.

Office Action dated Dec. 10, 2024 in JP Patent Application No. 2023-579528, pp. 1-12.

Office Action dated Dec. 23, 2022 in CA Patent Application No. 3174174, pp. 1-4.

Notice of Allowance dated Sep. 10, 2025 in CA Patent Appication No. 3,239,908, pp. 1.

Office Action dated Mar. 18, 2025 in CA Patent Application No. 3,239,908, pp. 1-4.

* cited by examiner

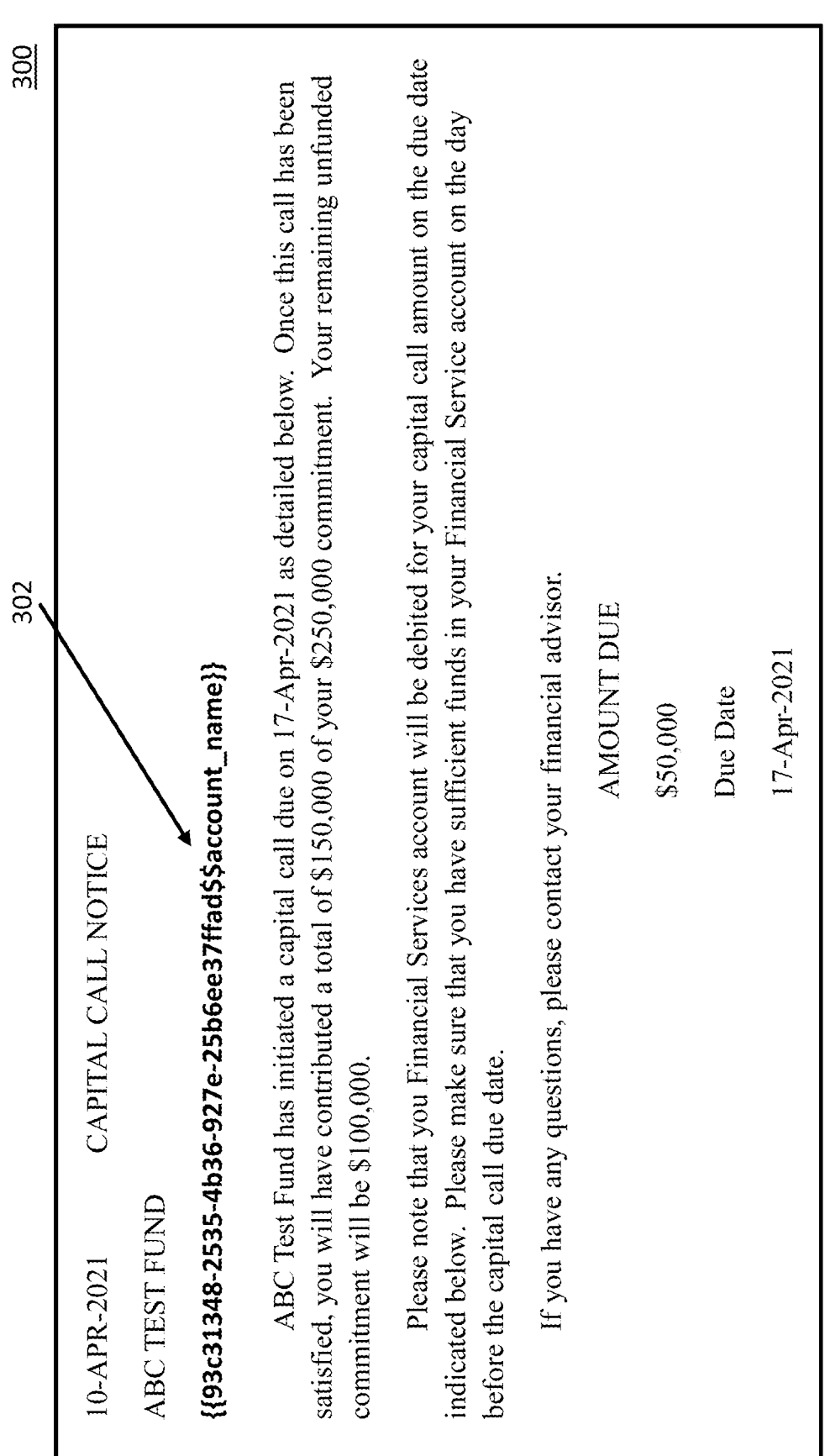

300

302

10-APR-2021     CAPITAL CALL NOTICE

ABC TEST FUND

{{93c31348-2535-4b36-927e-25b6ee37ffad$$account_name}}

ABC Test Fund has initiated a capital call due on 17-Apr-2021 as detailed below. Once this call has been satisfied, you will have contributed a total of $150,000 of your $250,000 commitment. Your remaining unfunded commitment will be $100,000.

Please note that you Financial Services account will be debited for your capital call amount on the due date indicated below. Please make sure that you have sufficient funds in your Financial Service account on the day before the capital call due date.

If you have any questions, please contact your financial advisor.

AMOUNT DUE $50,000

Due Date

17-Apr-2021

FIG. 3

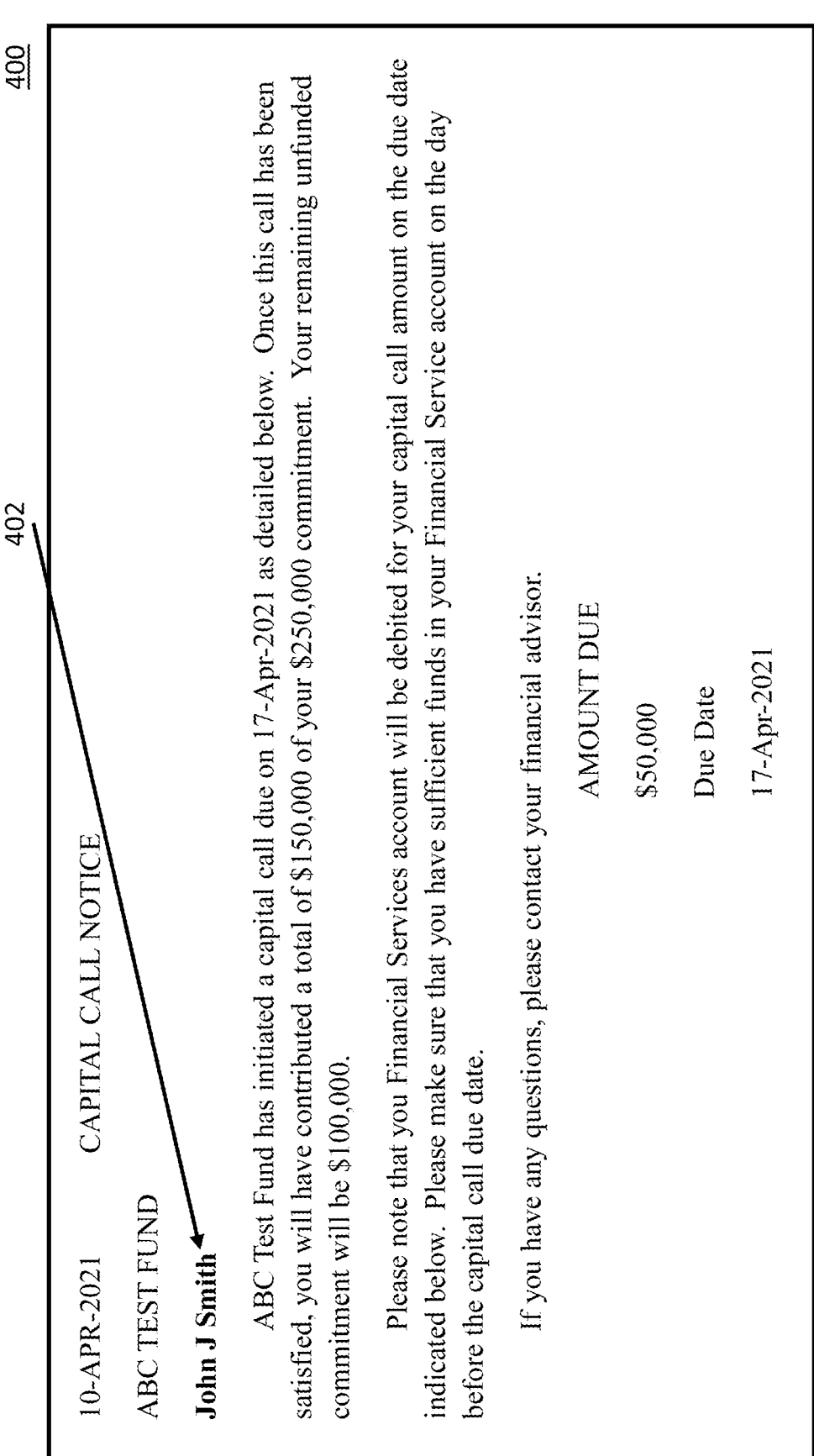

10-APR-2021        CAPITAL CALL NOTICE

ABC TEST FUND

John J Smith

ABC Test Fund has initiated a capital call due on 17-Apr-2021 as detailed below. Once this call has been satisfied, you will have contributed a total of $150,000 of your $250,000 commitment. Your remaining unfunded commitment will be $100,000.

Please note that you Financial Services account will be debited for your capital call amount on the due date indicated below. Please make sure that you have sufficient funds in your Financial Service account on the day before the capital call due date.

If you have any questions, please contact your financial advisor.

AMOUNT DUE $50,000

Due Date

17-Apr-2021

| Entity Identifier | 93c31348-2535-4b36-927e-25b6ee37ffad |
|---|---|
| Account Name | John J Smith |
| First Name | John |
| Middle Name | J |
| Last Name | Smith |
| Address Identifier(s) | a4d42459-3646-5c47-a38f-36c7ff4800be |
| Phone Number(s) | 212-555-1212; 646-555-1212 |
| Account Identifier(s) | aea9d156-e7fe-4494-a94a-86d8c983c25f |
| Tax Identifier | 999-99-9999 |
| Net Worth | $1,000,000.00 |

502

| Entity Identifier | 93c31348-2535-4b36-927e-25b6ee37ffad |
|---|---|
| Account Name | 93c31348-2535-4b36-927e-25b6ee37ffad$$account_name |
| First Name | 93c31348-2535-4b36-927e-25b6ee37ffad$$first_name |
| Middle Name | 93c31348-2535-4b36-927e-25b6ee37ffad$$middle_name |
| Last Name | 93c31348-2535-4b36-927e-25b6ee37ffad$$last_name |
| Address Identifier(s) | a4d42459-3646-5c47-a38f-36c7ff4800be |
| Phone Numbers | 93c31348-2535-4b36-927e-25b6ee37ffad$$phone |
| Account Identifier(s) | aea9d156-e7fe-4494-a94a-86d8c983c25f |
| Tax Identifier | 93c31348-2535-4b36-927e-25b6ee37ffad$$tax_id |
| Net Worth | 93c31348-2535-4b36-927e-25b6ee37ffad$$net_worth |

| Address Identifier | a4d42459-3646-5c47-a38f-36c7ff4800be |
|---|---|
| Address Line 1 | 123 Main Street |
| Address Line 2 | Apt 1A |
| City | New York |
| State | New York |
| Postal Code | 10001 |
| Country | US |

602

| Address Identifier | a4d42459-3646-5c47-a38f-36c7ff4800be |
|---|---|
| Address Line 1 | a4d42459-3646-5c47-a38f-36c7ff4800be$$addr1 |
| Address Line 2 | a4d42459-3646-5c47-a38f-36c7ff4800be$$addr2 |
| City | a4d42459-3646-5c47-a38f-36c7ff4800be$$city |
| State | a4d42459-3646-5c47-a38f-36c7ff4800be$$state |
| Postal Code | a4d42459-3646-5c47-a38f-36c7ff4800be$$postal |
| Country | a4d42459-3646-5c47-a38f-36c7ff4800be$$country |

FIG. 6

| 700 | |
| --- | --- |
| Account Identifier | aea9d156-e7fe-4494-a94a-86d8c983c25f |
| Account Name | John J Smith |
| Account Number | 123456789 |
| Entity Identifier(s) | 93c31348-2535-4b36-927e-25b6ee37ffad |
| Address Identifier(s) | a4d42459-3646-5c47-a38f-36c7ff4800be |
| Balance | $50,000.00 |

| 702 | |
| --- | --- |
| Account Identifier | aea9d156-e7fe-4494-a94a-86d8c983c25f |
| Account Name | aea9d156-e7fe-4494-a94a-86d8c983c25f$$account_name |
| Account Number | aea9d156-e7fe-4494-a94a-86d8c983c25f$$acct_no |
| Entity Identifier(s) | 93c31348-2535-4b36-927e-25b6ee37ffad |
| Address Identifier(s) | a4d42459-3646-5c47-a38f-36c7ff4800be |
| Balance | aea9d156-e7fe-4494-a94a-86d8c983c25f$$balance |

SYSTEMS, METHODS, AND MEDIA FOR GENERATING DOCUMENTS CONTAINING CONFIDENTIAL INFORMATION

CROSS-REFERENCE TO RELATED APPLICATIONS

This application is a continuation of U.S. patent application Ser. No. 17/567,640, filed Jan. 3, 2022, which is a continuation of each of U.S. patent application Ser. No. 17/356,097, filed Jun. 23, 2021, U.S. patent application Ser. No. 17/356,104, filed Jun. 23, 2021, and U.S. patent application Ser. No. 17/356,109, filed Jun. 23, 2021, each of which is hereby incorporated by reference herein in its entirety.

BACKGROUND

Confidential information, such as personally identifiable information (PII), medical information (e.g., protected health information regulated under the United States' Health Insurance Portability and Accountability Act (HIPAA)), and customer information (e.g., information of customers of financial services firms and law firms), needs to be secured against disclosure to parties who should not have that information. In many instances, when an organization (e.g., a company) is working with another party (e.g., a vendor) that generates documents related to confidential information, it is necessary to provide the confidential information to the other party. Unfortunately, providing the confidential information to the other party exposes the organization to risks that the confidential information will be stolen and/or misused, which could then expose the organization to liability (e.g., under the European Union's General Data Protection Regulation) and loss of revenue.

Accordingly, it is desirable to provide new mechanisms for generating documents containing confidential information.

SUMMARY

In accordance with some embodiments, systems, methods, and media for generating documents containing confidential information are provided.

In some embodiments, systems for generating documents with confidential information are provided, the systems comprising: a memory; and a first collection of at least of one hardware processor coupled to the memory and configured to: receive from a user device a request for a first document with confidential information; generate a second document, that corresponds to the first document, with at least one token corresponding to the confidential information; transmit the second document to a second collection of at least one hardware processor in a computer network that is entitled to access the confidential information; receive from the second collection of at least one hardware processor in the computer network a uniform resource locator (URL) corresponding to the first document; and transmit the URL to the user device. In some of these embodiments, the user device is in the computer network. In some of these embodiments, the second collection of at least one hardware processor in the computer network is in a server. In some of these embodiments, the first document is stored on the server. In some of these embodiments, the second collection of at least one hardware processor configured to: receive the second document from the first collection of at least one hardware processor; replace the at least one token in the second document to produce the first document; cause the first document to be stored; and transmit the URL to the first collection of at least one hardware processor. In some of these embodiments, the second collection of at least one hardware processor is further configured to serve the first document to the user device. In some of these embodiments, the user device is configured to: send the request for a first document to the first collection of at least one hardware processor; receive the URL; request the first document using the URL; receive the first document; and cause the first document to be presented.

In some embodiments, methods for generating documents with confidential information are provided, the methods comprising: receiving from a user device a request for a first document with confidential information; generating a second document, that corresponds to the first document, with at least one token corresponding to the confidential information using a first collection of at least one hardware processor; transmitting the second document to a second collection of at least one hardware processor in a computer network that is entitled to access the confidential information using the first collection of at least one hardware processor; receiving from the second collection of at least one hardware processor in the computer network a uniform resource locator (URL) corresponding to the first document; and transmitting the URL to the user device. In some of these embodiments, the user device is in the computer network. In some of these embodiments, the second collection of at least one hardware processor in the computer network is in a server. In some of these embodiments, the first document is stored on the server. In some of these embodiments, the second collection of at least one hardware processor configured to: receive the second document from the first collection of at least one hardware processor; replace the at least one token in the second document to produce the first document; cause the first document to be stored; and transmit the URL to the first collection of at least one hardware processor. In some of these embodiments, the second collection of at least one hardware processor is further configured to serve the first document to the user device. In some of these embodiments, the user device is configured to: send the request for a first document to the first collection of at least one hardware processor; receive the URL; request the first document using the URL; receive the first document; and cause the first document to be presented.

In some embodiments, non-transitory computer-readable media containing computer executable instructions that, when executed by a first collection of at least one hardware processor, cause the first collection of at least one hardware processor to perform a method for generating documents with confidential information are provided, the method comprising: receiving from a user device a request for a first document with confidential information; generating a second document, that corresponds to the first document, with at least one token corresponding to the confidential information; transmitting the second document to a second collection of at least one hardware processor in a computer network that is entitled to access the confidential information; receiving from the second collection of at least one hardware processor in the computer network a uniform resource locator (URL) corresponding to the first document; and transmitting the URL to the user device. In some of these embodiments, the user device is in the computer network. In some of these embodiments, the second collection of at least one hardware processor in the computer network is in a server. In some of these embodiments, the first document is stored on the server. In some of these embodiments, the second collection of at least one hardware processor configured to: receive the second document from the first collection of at least one hardware processor; replace the at least one token in the second document to produce the first document; cause the first document to be stored; and transmit the URL to the first collection of at least one hardware processor. In some of these embodiments, the second collection of at least one hardware processor is further configured to serve the first document to the user device. In some of these embodiments, the user device is configured to: send the request for a first document to the first collection of at least one hardware processor; receive the URL; request the first document using the URL; receive the first document; and cause the first document to be presented.

BRIEF DESCRIPTION OF THE DRAWINGS

FIG. 3 is an example of a document containing tokens in place of confidential information in accordance with some embodiments.

FIG. 4 is an example of a document containing confidential information in accordance with some embodiments.

FIG. 5 is an example of an entity record and an anonymized entity record in accordance with some embodiments.

FIG. 6 is an example of an address record and an anonymized address record in accordance with some embodiments.

FIG. 7 is an example of an account record and an anonymized account record in accordance with some embodiments.

DETAILED DESCRIPTION

In accordance with some embodiments, mechanisms (which can include systems, methods, and media) for generating documents containing confidential information are provided.

As described in more detail below, in some embodiments, in order to protect confidential information from theft and/or misuse, the confidential information can be stored in and accessed from a high-trust network. Devices in the high-trust network can be considered to be entitled to access the confidential information. Tokens, or any other suitable proxy for the confidential information, can be generated and associated with the confidential information. These tokens can then be provided to devices in a low-trust network that are not entitled to access the confidential information. Devices in the low-trust network can then generate documents with the tokens embedded therein (which may be referred to herein as an unenriched document) and devices in the high-trust networks can receive the documents, replace the tokens with appropriate confidential information (to create enriched documents), and present the documents to users using user devices on the high-trust network.

As described above and further below, these mechanisms provide an important technical solution to the problem of securely generating documents that contain confidential information without risking exposing the confidential information in low-trust networks. The mechanism enables an organization to use a vendor to generate documents that will ultimately contain confidential information without providing the confidential information to the vendor. Because the vendor does not have access to the confidential information, the organization and the vendor do not have to worry about confidential information being stolen or misused from the vendor's computers, and this protects the organization and the vendor from liability and revenue loss that would be associated with such theft and misuse.

Figure 1:
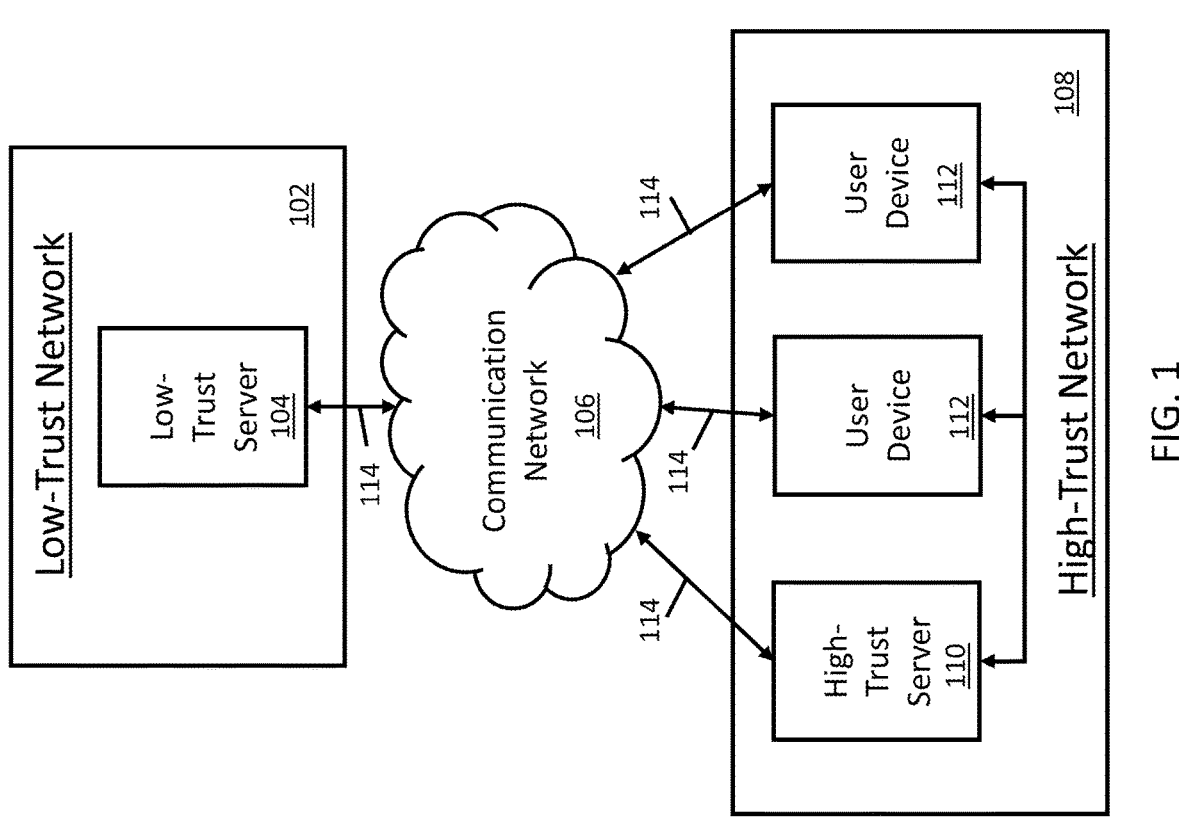
FIG. 1 is an example of a system for generating documents containing confidential information in accordance with some embodiments.

Turning to FIG. 1, an example 100 of a system for generating documents containing confidential information in accordance with some embodiments is shown. As illustrated, system 100 includes a low-trust server 104 in a low-trust network 102, a communication network 106, a high-trust server 110 in a high-trust network 108, one or more user devices 112 in the high-trust network, and communication links 114. Any other suitable components can be included in system 100.

Low-trust server 104 can be any suitable computing device that is not entitled to access certain confidential information. In some embodiments, low-trust server 104 can provide and/or generate documents to be enriched with the confidential information and/or perform any other suitable functions. While only one low-trust server 104 is shown in FIG. 1, any suitable number of low-trust servers can be used in some embodiments.

As shown in FIG. 1, low-trust server 104 can be part of a low-trust network 102 having devices that are not entitled to access certain confidential information. For example, low-trust network 102 can be a network maintained by a vendor that is not entitled to access the confidential information of a organization.

High-trust server 110 can be any suitable computing device that is entitled to access certain confidential information. In some embodiments, high-trust server 110 can enrich documents with confidential information and/or perform any other suitable functions. While only one high-trust server 110 is shown in FIG. 1, any suitable number of high-trust servers can be used in some embodiments.

User devices 112 can be any suitable devices for accessing certain confidential information as part of enriched documents. An example of a manner in which such enriched documents can be requested and provided is described below in connection with FIG. 8. While two user devices 112 are shown in FIG. 1, any suitable number of user devices can be used in some embodiments.

In some embodiments, user devices 112 can be any devices suitable for requesting and presenting enriched documents and/or performing any other suitable functions. For example, in some embodiments, user devices 112 can include a mobile device, such as a mobile phone, a tablet computer, a wearable computer, a laptop computer, and/or any other suitable mobile device. As another example, in some embodiments, user devices 112 can include a non-mobile device, such as a television, a projector device, a game console, desktop computer, and/or any other suitable non-mobile device.

As shown in FIG. 1, high-trust server 110 and user devices 112 can be part of a high-trust network 108 having devices that are entitled to access certain confidential information.

For example, high-trust network 108 can be a network maintained by an organization that is entitled to access the confidential information.

Communication network 106 can be any suitable combination of one or more wired and/or wireless networks in some embodiments. For example, communication network 106 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network.

Servers 104 and 110 and user devices 112 can be connected by one or more communications links 114 to communication network 106. The communications links can be any communications links suitable for communicating data among servers 104 and 110 and user devices 112, such as network links, dial-up links, wireless links, hard-wired links, any other suitable communications links, or any suitable combination of such links. In some embodiments, connections to communication network 106 can be through any suitable device, such as router, switch, gateway, and/or any other suitable device (not shown).

Figure 2:
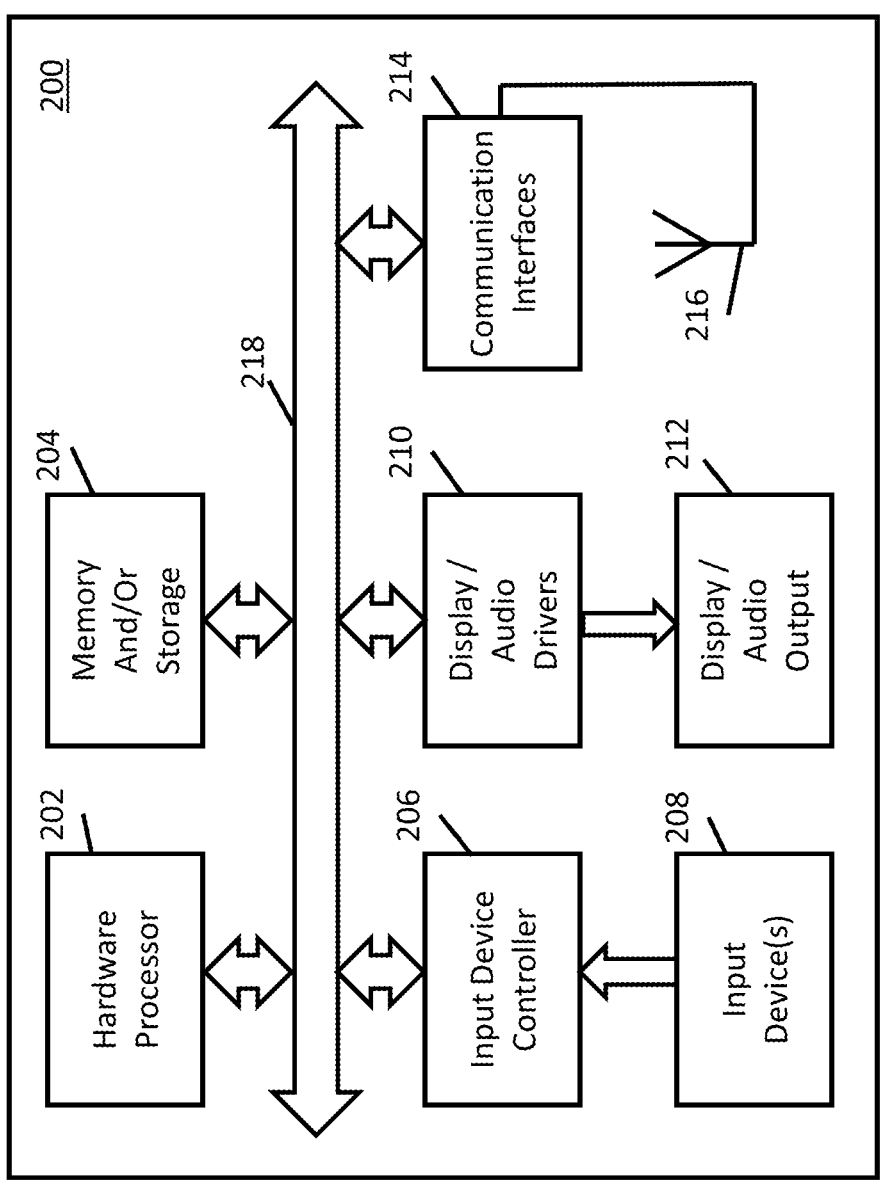
FIG. 2 is an example of hardware that can be used to implement some components of the system of FIG. 1 in accordance with some embodiments.

Servers 104 and/or 110 and/or user devices 112 can be implemented using any suitable hardware in some embodiments. For example, in some embodiments, Servers 104 and/or 110 and/or user devices 112 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 202 can be controlled by a computer program stored in memory and/or storage 204. For example, in some embodiments, the computer program can cause hardware processor 202 to perform functions described herein.

Memory and/or storage 204 can be any suitable memory and/or storage for storing programs, data, documents, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some embodiments. For example, input device controller 206 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output devices 212 in some embodiments. For example, display/audio drivers 210 can be circuitry for driving a touchscreen, a flat-panel display, a cathode ray tube display, a projector, a speaker or speakers, and/or any other suitable display and/or presentation devices.

Communication interface(s) 214 can be any suitable circuitry for interfacing with one or more communication networks, such as network 106 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network (e.g., communication network 106) in some embodiments. In some embodiments, antenna 216 can be omitted.

Bus 218 can be any suitable mechanism for communicating between two or more components 202, 204, 206, 210, and 214 in some embodiments.

Any other suitable components can be included in hardware 200 in accordance with some embodiments.

Turning to FIGS. 3 and 4, examples 300 and 400 of an unenriched document and an enriched document, respectively, are shown in accordance with some embodiments.

In FIG. 3, an example unenriched document 300 for a "CAPITAL CALL NOTICE" is shown. It should be understood that document 300 can be for any suitable purpose and can have any suitable content in some embodiments. As also shown, document 300 includes a token 302 that identifies confidential information that can be used to enrich the document. While only one token is included in document 300, any suitable number of tokens and types of tokens can be used in some embodiments. In some embodiments, token 302 can include two pieces of information: (1) an identifier of a record ("93c31348-2535-4b36-927e-25b6ee37ffad"); and (2) an identifier of a field within the record ("account_name"). The identified record and field can be used to place confidential information in the unenriched document. For example, as shown in document 400 of FIG. 4, token 302 has been replaced with confidential information ("John J Smith") 402.

Turning to FIG. 5, an example 500 of a record for storing an entity's confidential information (in this case, a person's confidential information, though confidential information can be stored for any suitable type of entity in some embodiments), and an anonymized record 502 for linking to such confidential information is illustrated in accordance with some embodiments.

As shown, record 500 includes fields for an entity identifier ("93c31348-2535-4b36-927e-25b6ee37ffad"), an account name ("John J Smith"), a first name ("John"), a middle name ("J"), a last name ("Smith"), one or more address identifiers ("a4d42459-3646-5c47-a38f-36c7ff4800be"), one or more phone numbers ("212-555-1212; 646-555-1212"), one or more account identifiers ("aea9d156-e7fe-4494-a94a-86d8c983c25f"), a tax identifier ("999-99-9999"), and a net worth ("$1,000,000.00"). Record 500 can be stored on high-trust server 110 in some embodiments.

While specific fields are provided in FIG. 5 for purposes of illustration, it should be understood that any suitable number and type of fields can be used in some embodiments.

Entity identifier ("93c31348-2535-4b36-927e-25b6ee37ffad") can be used to uniquely identify the record for "John J Smith" in unenriched documents.

Address identifier(s) ("a4d42459-3646-5c47-a38f-36c7ff4800be") and account identifier(s) ("aea9d156-e7fe-4494-a94a-86d8c983c25f") can be used to identify address record(s) and account record(s) associated with "John J Smith".

Once record 500 is anonymized, the record can appear as shown by anonymized record 502. Record 502 can be stored on low-trust server 104 in some embodiments.

As shown, record 502 can replace the account name with "93c31348-2535-4b36-927e-25b6ee37ffad$$account_name", the first name with "93c31348-2535-4b36-927e-25b6ee37ffad$$first_name", the middle name with "93c31348-2535-4b36-927e-25b6ee37ffad$$middle_name", the last name with "93c31348-2535-4b36-927e-25b6ee37ffad$$last_name", the phone number(s) with "93c31348-2535-4b36-927e-25b6ee37ffad$$phone", the tax identifier with "93c31348-2535-4b36-927e-25b6ee37ffad$$tax id", and the net worth with "93c31348-2535-4b36-927e-25b6ee37ffad$$net worth".

Turning to FIG. 6, an example 600 of a record for storing an entity's address confidential information, and an anonymized record 602 for linking to such confidential information is illustrated in accordance with some embodiments.

As shown, record 600 includes fields for an address identifier ("a4d42459-3646-5c47-a38f-36c7ff4800be"), an address line 1 ("123 Main Street"), an address line 2 ("Apt 1A"), a city ("New York"), a state ("New York"), a postal code ("10001"), and a country ("US"). Record 600 can be stored on high-trust server 110 in some embodiments.

While specific fields are provided in FIG. 6 for purposes of illustration, it should be understood that any suitable number and type of fields can be used in some embodiments.

Address identifier ("a4d42459-3646-5c47-a38f-36c7ff4800be") can be used to uniquely identify the record for the address in unenriched documents.

Once record 600 is anonymized, the record can appear as shown by anonymized record 602. Record 602 can be stored on low-trust server 104 in some embodiments.

As shown, record 602 can replace the address line 1 with "a4d42459-3646-5c47-a38f-36c7ff4800be$$addr1", the address line 2 with "a4d42459-3646-5c47-a38f-36c7ff4800be$$addr2", the city with "a4d42459-3646-5c47-a38f-36c7ff4800be$$city", the state with "a4d42459-3646-5c47-a38f-36c7ff4800be$$state", the postal code with "a4d42459-3646-5c47-a38f-36c7ff4800be$$postal", and the country with "a4d42459-3646-5c47-a38f-36c7ff4800be$$country".

Figure 7:
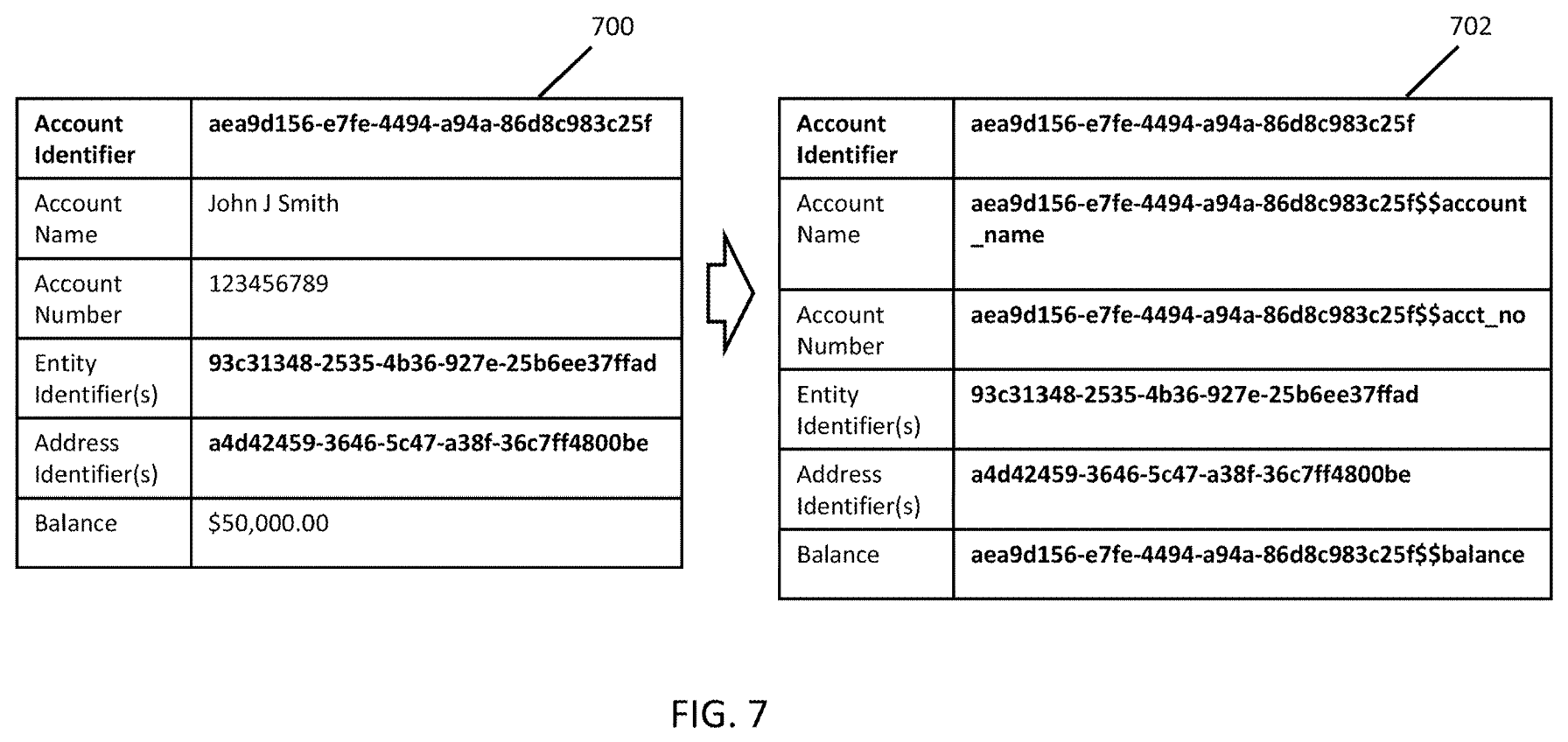

Turning to FIG. 7, an example 700 of a record for storing an entity's account confidential information, and an anonymized record 702 for linking to such confidential information is illustrated in accordance with some embodiments.

As shown, record 700 includes fields for an account identifier ("aea9d156-e7fe-4494-a94a-86d8c983c25f"), an account name ("John J Smith"), an account number ("123456789"), entity identifier(s) ("93c31348-2535-4b36-927e-25b6ee37ffad"), address identifier(s) ("a4d42459-3646-5c47-a38f-36c7ff4800be"), and a balance ("$50,000.00"). Record 700 can be stored on high-trust server 110 in some embodiments.

While specific fields are provided in FIG. 7 for purposes of illustration, it should be understood that any suitable number and type of fields can be used in some embodiments.

Entity identifier(s) ("93c31348-2535-4b36-927e-25b6ee37ffad") can be used to uniquely identify the entity (entities) for the account in unenriched documents. Address identifier(s) ("a4d42459-3646-5c47-a38f-36c7ff4800be") can be used to uniquely identify the address(es) for the account in unenriched documents.

Once record 700 is anonymized, the record can appear as shown by anonymized record 702. Record 702 can be stored on low-trust server 104 in some embodiments.

As shown, record 702 can replace the account name with "aea9d156-e7fe-4494-a94a-86d8c983c25f$$account_name", the account number with "aea9d156-e7fe-4494-a94a-86d8c983c25f$$acct_no", and the country with "aea9d156-e7fe-4494-a94a-86d8c983c25f$$balance".

Figure 8:
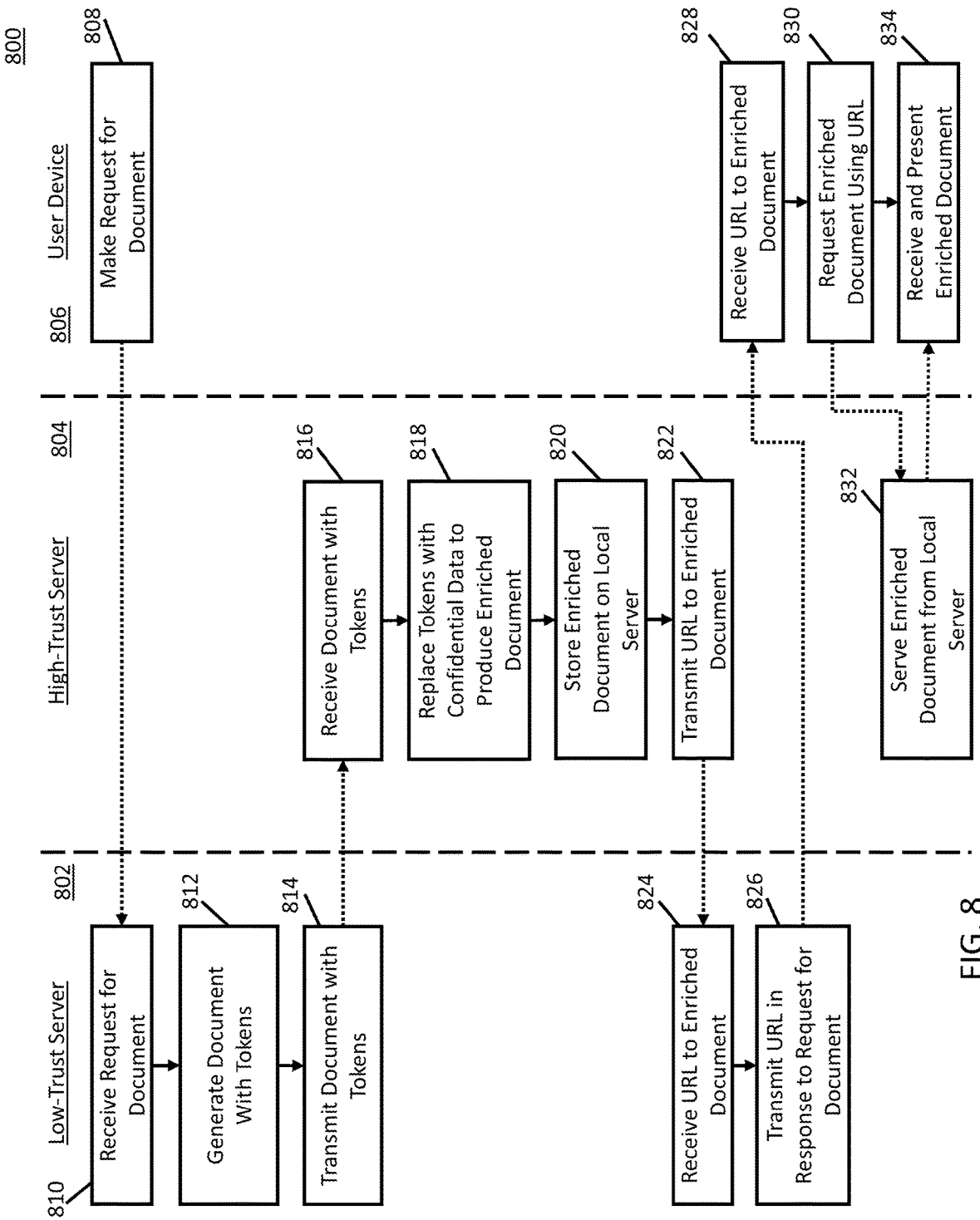
FIG. 8 is an example of a process for generating a document containing confidential information in accordance with some embodiments.

Turning to FIG. 8, an example 800 of a process for providing an enriched document to a user of a user device in accordance with some embodiments is shown. As illustrated, process 800 can be implemented as three subprocesses 802, 804, and 806 that are executed on low-trust server 104, high-trust server 110, and a user device 112, respectively, in some embodiments.

Process 800 can begin in some embodiments by making a request for a document with confidential information at 808. This request can be made in any suitable manner in some embodiments. For example, in some embodiments, a user of a user device 112 can click on a link in a web browser for a document, and the browser can send a suitable request to low-trust server 104. As another example, in some embodiments, a user of a user device 112 can click on a menu option in an app, and the app can send a suitable request to low-trust server 104. The request can then be received at 810.

Next, at 812, process 800 can generate the requested document with one or more tokens filling any fields in the document that will contain confidential information. The document can have any suitable content, and any suitable number and type of tokens can be present in the document. As described above, an example of a document with a token is shown in FIG. 3.

The generated document can then be transmitted from low-trust server 104 to high-trust server 110 at 814. The high-trust server can receive the document at 816.

At 818, the high-trust server can replace the tokens with confidential information to produce an enriched document. For example, the high-trust server can scan the document for tokens and for each token found, the server can search a database for the confidential information corresponding to that token and replace the token in the document with the confidential information.

Next, at 820, process 800 can store the enriched document in a server. In some embodiments, this server can be the high-trust server or any other suitable server. In some embodiments, this server can be located on high-trust network 108.

A uniform resource locator (URL) corresponding to the enriched document can then be transmitted to low-trust server 104 at 822. The low-trust server can receive the URL at 824.

Then, at 826, the low-trust server can transmit the URL to user device 112 in response to the request made at 808. The URL can be received by the user device at 828.

Next, at 830, the user device can request the enriched document from the server on which the document was stored at 820 using the URL.

At 832, the server on which the document was stored at 820 can serve the document to the user device. In some embodiments, this server will only serve the document to the user device when the user device is in high-trust network 108. That is, if the user device is outside high-trust network 108, this server may skip providing the document to the user device in some embodiments.

Finally, at 834, the user device can receive the enriched document and present it in any suitable manner (such as by displaying it on a screen on the user device, causing it to by printed by a printer coupled to the user device, etc.).

Figure 9:
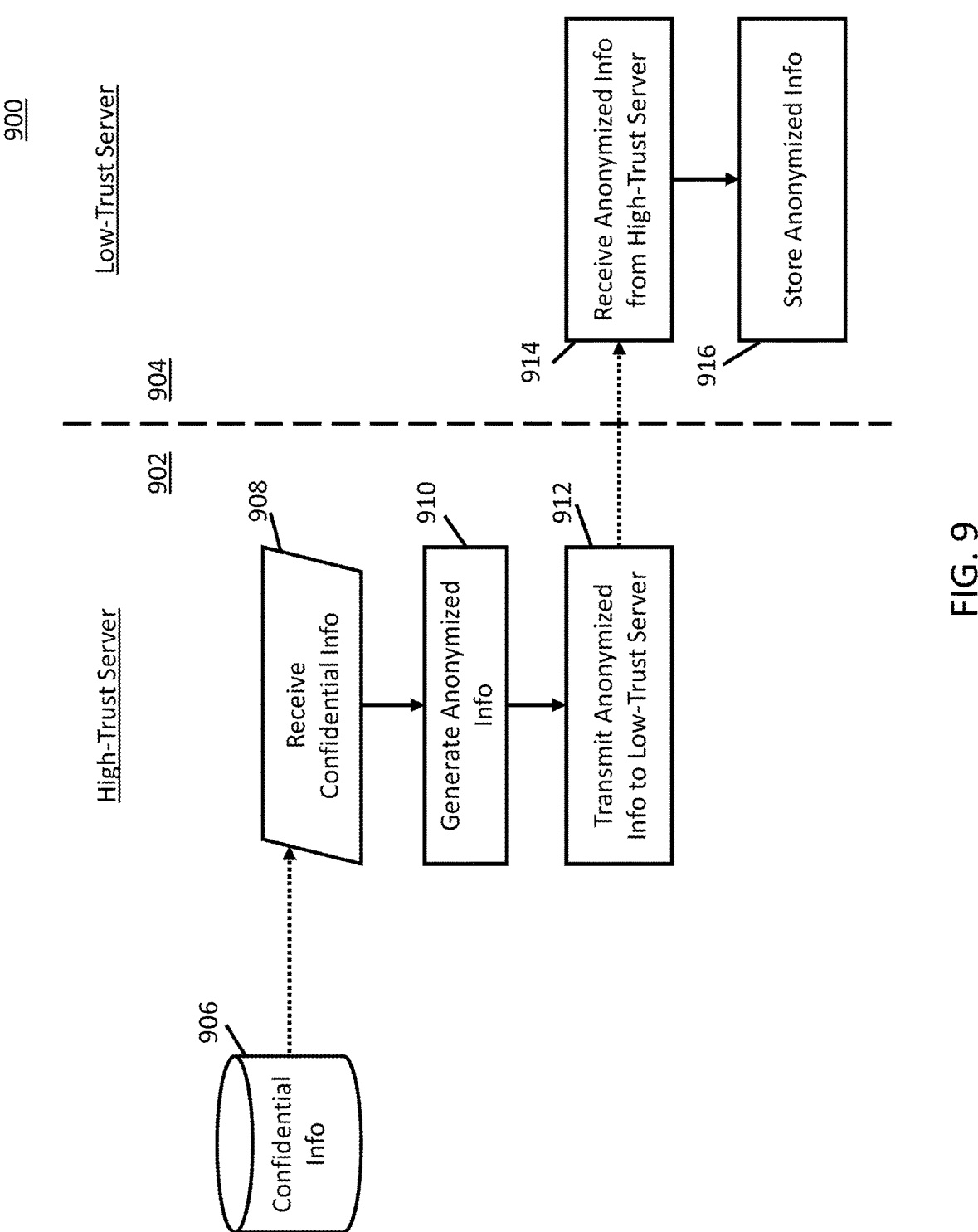
FIG. 9 is an example of process for synchronizing confidential information and tokens between a high-trust network and a low-trust network in accordance with some embodiments.

Turning to FIG. 9, an example 900 of a process for synchronizing confidential information and tokens is shown in accordance with some embodiments. As shown process 900 can be implemented as two subprocesses 902 and 904 that are executed on high-trust server 110 and low-trust server 104, respectively, in some embodiments.

Process 900 can begin by receiving confidential information 906 at 908. Any suitable confidential information can be received, and this confidential information can be received in any suitable manner from any suitable source. For example, confidential information such as entity information, address information, and account information as described in connection with FIGS. 5-7 can be received in some embodiments. As another example, in some embodiments, this confidential information can be received as an upload from a comma-separated-value (CSV) file, as a hyper-text transfer protocol (http) post message, as a web hook, and/or in any other suitable manner.

Next, at 910, process 900 can generate anonymized information. This anonymized information can be generated in any suitable manner. For example, an identifier of a record for the confidential information can be generated as a hash (e.g., MD5) of a portion of the confidential information. As another example, an identifier of a record for the confidential information can be randomly or pseudo-randomly generated and confirmed as not being duplicative of an already-generated identifier. The generated identifier and field names can then be used to anonymize the confidential information as described above in connection with FIGS. 5-7.

Then, at 912, process 900 can transmit the anonymized information to low-trust server 104. This anonymized information can then be received by the low-trust server at 914.

Finally, at 916, the low-trust server can store the anonymized information in any suitable manner.

It should be understood that at least some of the above-described blocks of the processes of FIGS. 8 and 9 can be executed or performed in any order or sequence not limited to the order and sequence shown in and described in connection with the figures. Also, some of the above blocks of the processes of FIGS. 8 and 9 can be executed or performed substantially simultaneously where appropriate or in parallel to reduce latency and processing times. Additionally or alternatively, some of the above described blocks of the processes of FIGS. 8 and 9 can be omitted.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for generating documents with confidential information, comprising:
   a memory; and
   a first collection of at least of one hardware processor that is coupled to the memory, that is in a first computer network that is not entitled to access the confidential information, and that is configured to:
   receive from a device a request for a first document with the confidential information;
   generate a second document, that corresponds to the first document, with at least one proxy corresponding to the confidential information;
   transmit the second document to a second collection of at least one hardware processor in a second computer network that is entitled to access the confidential information;
   receive from the second collection of at least one hardware processor in the second computer network an address corresponding to the first document; and
   transmit the address to the device.

2. The system of claim 1, wherein the device is in the second computer network.

3. The system of claim 1, wherein the device is configured to:
   send the request for the first document to the first collection of at least one hardware processor;
   receive the address;
   request the first document using the address;
   receive the first document; and
   cause the first document to be presented.

4. The system of claim 1, wherein the second collection of at least one hardware processor in the second computer network is in a server.

5. The system of claim 4, wherein the first document is stored on the server.

6. The system of claim 1, wherein the second collection of at least one hardware processor configured to:
   receive the second document from the first collection of at least one hardware processor;
   replace the at least one proxy in the second document to produce the first document;
   cause the first document to be stored; and
   transmit the address to the first collection of at least one hardware processor.

7. The system of claim 6, wherein the second collection of at least one hardware processor is further configured to serve the first document to the device.

8. A method for generating documents with confidential information, comprising:
   receiving from a device a request for a first document with the confidential information;
   generating a second document, that corresponds to the first document, with at least one proxy corresponding to the confidential information using a first collection of at least one hardware processor that is in a first computer network that is not entitled to access the confidential information;
   transmitting the second document to a second collection of at least one hardware processor in a second computer network that is entitled to access the confidential information using the first collection of at least one hardware processor;

receiving from the second collection of at least one hardware processor in the second computer network an address corresponding to the first document; and transmitting the address to the device.

9. The method of claim 8, wherein the device is in the second computer network.

10. The method of claim 8, wherein the device is configured to:

send the request for the first document to the first collection of at least one hardware processor;

receive the address;

request the first document using the address;

receive the first document; and cause the first document to be presented.

11. The method of claim 8, wherein the second collection of at least one hardware processor in the second computer network is in a server.

12. The method of claim 11, wherein the first document is stored on the server.

13. The method of claim 8, wherein the second collection of at least one hardware processor configured to:

receive the second document from the first collection of at least one hardware processor;

replace the at least one proxy in the second document to produce the first document;

cause the first document to be stored; and transmit the address to the first collection of at least one hardware processor.

14. The method of claim 13, wherein the second collection of at least one hardware processor is further configured to serve the first document to the device.

15. A non-transitory computer-readable medium containing computer executable instructions that, when executed by a first collection of at least one hardware processor that is in a first computer network that is not entitled to access confidential information, cause the first collection of at least one hardware processor to perform a method for generating documents with the confidential information, the method comprising:

receiving from a device a request for a first document with the confidential information;

generating a second document, that corresponds to the first document, with at least one proxy corresponding to the confidential information;

transmitting the second document to a second collection of at least one hardware processor in a second computer network that is entitled to access the confidential information;

receiving from the second collection of at least one hardware processor in the second computer network an address corresponding to the first document; and transmitting the address to the device.

16. The non-transitory computer-readable medium of claim 15, wherein the device is in the second computer network.

17. The non-transitory computer-readable medium of claim 15, wherein the device is configured to:

send the request for the first document to the first collection of at least one hardware processor;

receive the address;

request the first document using the address;

receive the first document; and cause the first document to be presented.

18. The non-transitory computer-readable medium of claim 15, wherein the second collection of at least one hardware processor in the second computer network is in a server.

19. The non-transitory computer-readable medium of claim 18, wherein the first document is stored on the server.

20. The non-transitory computer-readable medium of claim 15, wherein the second collection of at least one hardware processor configured to:

receive the second document from the first collection of at least one hardware processor;

replace the at least one proxy in the second document to produce the first document;

cause the first document to be stored; and transmit the address to the first collection of at least one hardware processor.

21. The non-transitory computer-readable medium of claim 20, wherein the second collection of at least one hardware processor is further configured to serve the first document to the device.

* * * * *